United States Patent

[11] 3,628,814

[72] Inventor Harry Hallwood
 Arlington Heights, Ill.
[21] Appl. No. 31,537
[22] Filed Apr. 24, 1970
[45] Patented Dec. 21, 1971
[73] Assignee Midweso-Enterprise, Inc.
 Chicago, Ill.

[54] INFLATABLE TEMPORARY FIELD JOINT
 3 Claims, 3 Drawing Figs.
[52] U.S. Cl. .................................................. 285/45,
 277/34.3, 285/97, 285/369
[51] Int. Cl. ................................................. F16l 11/12
[50] Field of Search ................................... 285/96, 97,
 106, 260, 45; 277/34.3

[56] References Cited
UNITED STATES PATENTS
3,480,043 11/1969 Proudfoot et al. ............ 285/97 X
3,023,995 3/1962 Hopkins ....................... 285/97 X
3,175,032 3/1965 Strauss ........................ 285/97 X
FOREIGN PATENTS
746,357 3/1933 France ......................... 285/97
1,174,585 7/1964 Germany ..................... 285/97

Primary Examiner—Jacob Shapiro
Assistant Examiner—David H. Corbin
Attorney—Lettvin and Gerstman ABSTRACT: A joint for temporary bridging and sealing spaced ends of conduit to prevent entry of moisture under field conditions is provided by a flexible elongated plastic sleeve having inflatable circumferential collars at the ends of the sleeve.

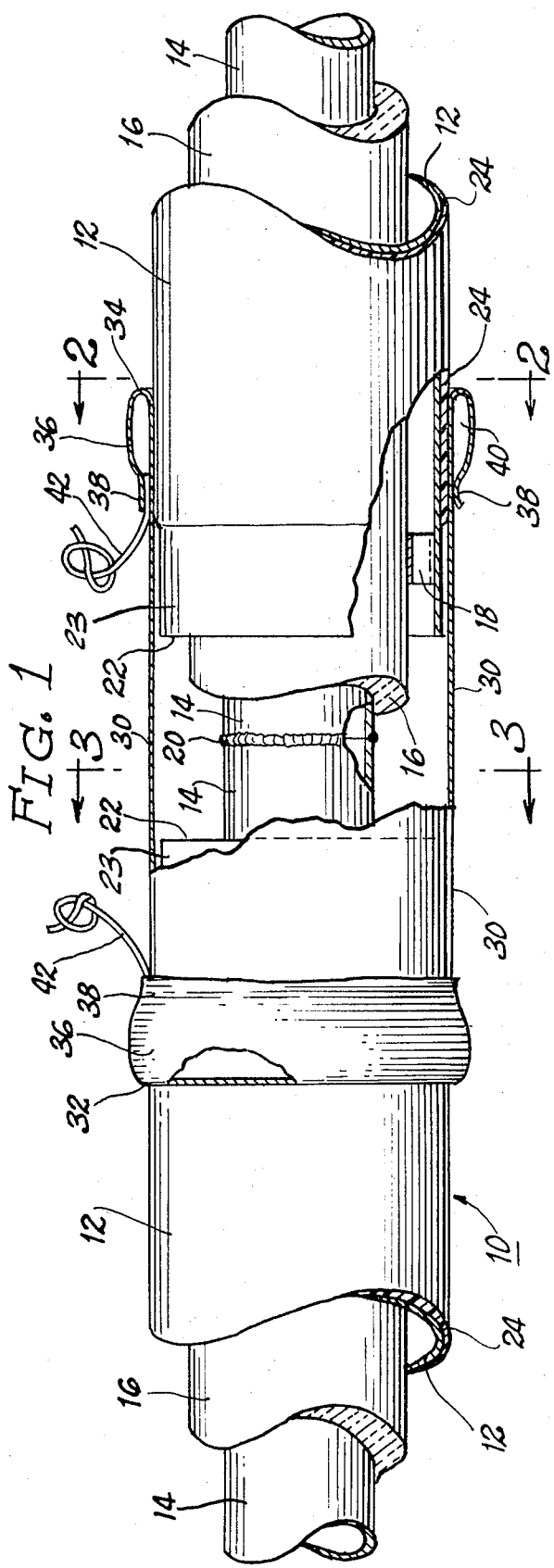
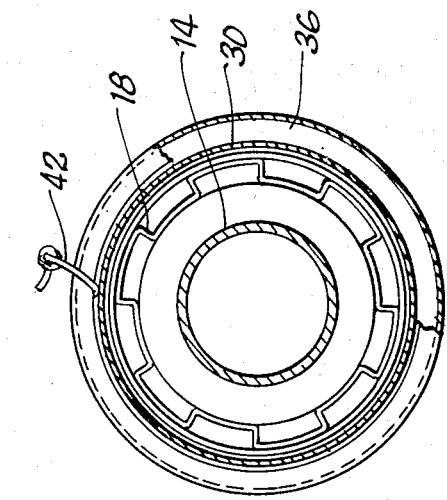
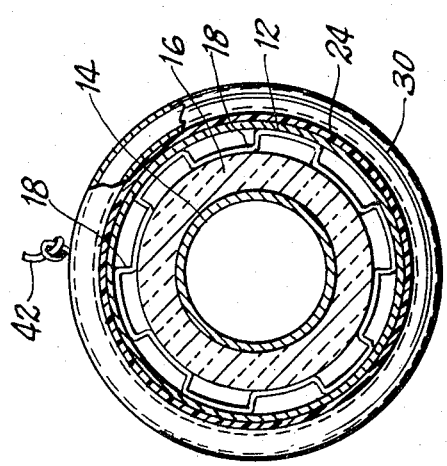
INVENTOR
Harry Hallwood
by Lettvin and Gerstman
Attys

INFLATABLE TEMPORARY FIELD JOINT

FIELD OF THE INVENTION

This invention relates to a temporary joint for bridging conduit ends to prevent undesirable entry of moisture into the conduit sections.

BACKGROUND OF THE INVENTION

A type of underground conduit system to which this invention is applicable generally comprises an inner service pipe through which water or steam flows, thermal insulation surrounding the inner pipe, and an outer conduit coaxially positioned with respect to the inner pipe and insulation. Generally there are field joints provided at various intervals along the conduit system, with a space normally provided between adjacent ends of the outer conduit sections before final connection. After the inner pipe has been tested and insulated, a coupling is normally welded to the outer conduit sections to bridge the space, thereby making the outer conduit continuous and watertight.

If at the end of the workday all of the couplings are not completed, the spaces between conduit sections are normally left open, and in the event of trench flooding due to heavy storms or accidents, the conduit system may be flooded thereby saturating the insulation and establishing corrosive conditions within the conduit. The insulation then has to be dried out by introducing steam into the inner pipe, to generate sufficient heat in the insulation so that the moisture is evaporated from the insulation. In turn, the vapor from the insulation is removed from within the outer conduit by forcing air into the conduit at one end and allowing the vapor and air to escape from the opposite end. The difficulty and undesirable expense of a corrective operation such as the foregoing is apparent.

It is an object of the present invention to obviate the aforesaid problems which occur when a space between adjacent conduit ends is left open to possible entry of moisture, by providing an effective temporary field joint which is simple and inexpensive in construction and reliable in operation by being substantially impermeable to moisture.

SUMMARY OF THE INVENTION

In accordance with the present invention, there is provided a temporary joint for bridging conduit ends. The joint comprises a flexible sleeve, of a plastic impermeable material, having an inside diameter that is greater than the external diameter of the conduit to be bridged, and having a length that is greater than the distance between the spaced conduit ends, and with inflatable annular collars formed at each of the ends of the sleeve so that when inflated they will grip the outer wall of the conduit sections to provide a liquid impervious seal at the area of engagement of each collar with the outer surface of the conduit. Means are provided at each collar for ready connection to a supply of air or gas under pressure for inflation of the collars.

In the illustrative embodiment of the invention, the collars are portions of the sleeve member that have been retroverted and sealed to the sleeve to provide toroidal, inflatable spaces which when inflated provide a continuous circumferential seal between each collar and the surrounded end of the outer conduit section. The inflatable connection is a tube that has one end in communication with the inside of the inflatable collar.

A more detailed explanation of the invention is provided in the following description and claims, and is illustrated in the accompanying drawing.

BRIEF DESCRIPTION OF THE DRAWING

FIG. 1 is a fragmentary, broken elevational view of a conduit system employing a temporary field joint in accordance with the principles of the present invention;

FIG. 2 is a sectional elevation thereof, taken along the line 2—2 of FIG. 1; and FIG. 3 is a sectional elevation thereof, taken along the line 3—3 of FIG. 1.

DETAILED DESCRIPTION OF THE ILLUSTRATIVE EMBODIMENT

Referring to FIG. 1, the conduit system 10 illustrated therein includes an outer metal conduit 12 concentrically surrounding an inner metal service pipe 14 of the type through which water or steam flows. Of course, conduit 12 could surround more than one inner service pipe.

Inner service pipe 14 is surrounded by insulation 16 and is spaced from outer conduit 12 by means of a spacer 18 located between insulation 16 and the inner surface of outer conduit 12. Inner service pipe 14 is formed of sections which are to be butt-welded at various locations, as at 20 (FIG. 1). Although the inner pipe ends are abutting, the ends 22 of outer conduit sections 12 are normally spaced apart to provide access to the inner pipes, allowing them to be welded, tested and insulated. A coal tar protective coating 24 is provided over all of the external surface of conduit 12 except for portions 23 adjacent ends 22, which portions remain bare.

If the workday ends before inner pipes 14 have been welded, inspected and insulated, and/or before the outer conduit sections 12 have been properly coupled, substantial damage may occur at the open space between the conduit ends as aforesaid. It is therefore important that the space inwardly of outer conduits 12 be fully protected overnight and preferably at all times. To the foregoing end, a temporary joint in the form of a flexible sleeve 30, which is preferably formed of extruded polyethylene or polyvinyl chloride, is provided in a length sufficient to bridge the space between ends 22 of conduit sections 12, and of a characteristic to permit stretching for a purpose hereinafter made clear. The inside diameter of sleeve 30 is not less than, and preferably greater than, the external diameter of conduit 12 with coal tar protective coating 24 thereon, and the length of the sleeve 30 even after collars are provided thereon, as hereinafter described, is greater than the distance between the spaced conduit ends 22.

In certain applications, the sleeve 30 could be used to bridge conduit ends which are abutting each other, and in such applications, of course, the distance between the conduit ends would be zero and a sleeve having a relatively smaller length could be utilized.

In the illustrative embodiment, the length of the temporary joint is such that opposite distal ends 32 and 34 thereof are located beyond the free ends of conduit sections 12 to a region covered by the coal tar coating 24. Inflatable collars 36 are formed at each end of the sleeve 30 by turning over, or retroverting, portions of the sleeve to form a double layer that surrounds a toroidal space. Continuous circumferential seals 38 are provided between the retroverted portions of the sleeve to provide a gas retaining or gas pocket 40. It is preferred that seals 38 be formed by the simple process of heat sealing, although an adhesive could also be used. Means for separately inflating each collar 36 is provided by means of an elongated inflating tube 42. The tube 42 is appropriately secured with one end opening to the interior of the toroidal space of the pocket 40. A typical securement is provided by passing the tube between opposed portions of sleeve 30 at the joint 38 and effecting air sealing around the periphery of tube 42. Thus, the temporary joint is provided by a sleeve 30 that has an inflatable collar 36 at each end thereof with an inflation tube 42 in communication with the air pocket 40 formed within each collar 36.

In usage, one temporary joint is provided on each outer section 12. At the end of the workday, the temporary joint will be moved to a position where sleeve 30 bridges the space between ends 22 of adjacent sections 12 and so that the spaced collars 36 are in position to grip the surrounded portion of a section 12. Air or other gas is then introduced under pressure into the collar 36 through the inflating tube 42 by means of a small hand pump, or by a compressor, which operates to inflate the circumferential collar 36. The collars are radially expansible under gas pressure and hence distend radially inwardly to engage and snugly contact the coal tar coating on, or the bare surface of, the conduits 12 to effectively seal the conduits so that entry of moisture and flood water is prevented.

After collars 36 are inflated, each elongated tube 42 is crimped by the simple expedient of knotting it to prevent the gas from escaping from the collar. Thereafter, when the work is to be resumed for completion of the joint, the knots on tubes 42 can be untied and the gas will be readily expelled from the collar. Reducing the expanded annular collar then allows sleeve 30 to be slid along section 12 away from the ends 22 thereby exposing the ends of the conduit to be worked on.

If the inner conduit ends have not yet been joined, the temporary joint may be removed and reused. On the other hand, the cost of the item is relatively low so that a sleeve 30 may merely be left in position on the conduit 12 to one side of the completed joint.

It is seen that a temporary joint has been provided which is inexpensive to produce, simple to operate, and enables the rapid construction of a weather impermeable joint which can easily be removed when desired. Although an illustrative embodiment of the invention has been shown and described, it is to be understood that various modifications and substitutions may be made by those skilled in the art without departing from the spirit and scope of the present invention.

What is claimed is:

1. A temporary joint for bridging spaced conduit ends, which comprises: a flexible elongated sleeve of liquid impervious material that is stretchable circumferentially and having an inside diameter that is normally not less than the external diameter of the conduit ends and having a length that is greater than the distance between a pair of adjacent conduit ends; portions of the sleeve adjacent the free ends thereof being retroverted and circumferentially sealed permanently to the body of the sleeve to provide a gas-inflatable annular collar at each of the ends of the sleeve and adapted to provide a substantially liquid impervious seal at the region of engagement of each collar with the outer surface of the conduit; and inflation means connected to each collar for connection to a supply of gas for selective inflation of said collars.

2. A temporary joint as described in claim 1, wherein the inflation means for the collar is an elongated flexible tube which may be readily crimped to provide a simple valve for retaining gas under pressure within the inflated collar.

3. A temporary joint as described in claim 1, wherein said joint is formed of a flexible plastic material so that each inflatable collar is radially expansible inwardly of the normal dimension of the sleeve.

* * * * *